United States Patent
Tanaka

(10) Patent No.: US 10,073,114 B2
(45) Date of Patent: Sep. 11, 2018

(54) PHYSICAL QUANTITY SENSOR, PHYSICAL QUANTITY SENSOR APPARATUS, ELECTRONIC DEVICE, AND MOBILE BODY

(71) Applicant: Seiko Epson Corporation, Tokyo (JP)

(72) Inventor: Satoru Tanaka, Chino (JP)

(73) Assignee: Seiko Epson Corporation (JP)

( * ) Notice: Subject to any disclaimer, the term of this patent is extended or adjusted under 35 U.S.C. 154(b) by 117 days.

(21) Appl. No.: 14/822,008

(22) Filed: Aug. 10, 2015

(65) Prior Publication Data

US 2016/0047838 A1   Feb. 18, 2016

(30) Foreign Application Priority Data

Aug. 15, 2014   (JP) ................. 2014-165430

(51) Int. Cl.
*G01P 15/125*   (2006.01)
(52) U.S. Cl.
CPC .................. *G01P 15/125* (2013.01)
(58) Field of Classification Search
CPC ............ G01L 5/125; G01P 2015/0814; G01P 2015/0877
USPC ...................................... 73/514.32
See application file for complete search history.

(56) References Cited

U.S. PATENT DOCUMENTS

| 8,096,179 B2 | 1/2012 | Bien et al. |
| 8,490,461 B2 | 7/2013 | Sasaki et al. |
| 2005/0132805 A1* | 6/2005 | Park ............... G01P 15/125 |
| | | 73/514.32 |

FOREIGN PATENT DOCUMENTS

| JP | 2000-074939 A | 3/2000 |
| JP | 2012-523565 A | 10/2012 |
| JP | 2013-127436 A | 6/2013 |
| WO | WO-2010-103776 A1 | 9/2010 |

* cited by examiner

*Primary Examiner* — John Chapman, Jr.
(74) *Attorney, Agent, or Firm* — Harness, Dickey & Pierce, P.L.C.

(57) ABSTRACT

A physical quantity sensor has a first structure which has a movable section that includes movable electrode fingers, a second structure which includes first fixed electrode fingers that are arranged to oppose the movable electrode fingers, a third structure which includes second fixed electrode fingers that are arranged to oppose the movable electrode fingers, and a first electrostatic capacity forming section that forms an electrostatic capacity between the first structure and the second structure.

16 Claims, 10 Drawing Sheets

PHYSICAL QUANTITY SENSOR, PHYSICAL QUANTITY SENSOR APPARATUS, ELECTRONIC DEVICE, AND MOBILE BODY

BACKGROUND

1. Technical Field

The present invention relates to a physical quantity sensor, a physical quantity sensor apparatus, an electronic device, and a mobile body.

2. Related Art

For example, an acceleration sensor (a physical quantity sensor) according to JP-A-2013-127436 has a movable section which includes a movable electrode section, and first and second fixed electrode sections which are arranged so as to oppose the movable electrode section, and is able to detect a received acceleration based on electrostatic capacity between the movable electrode section, which is changed by displacement of the movable section, and the first and second fixed electrode sections. In order to detect acceleration with greater precision, the acceleration sensor with such a configuration is designed such that the electrostatic capacity between the movable electrode section and the first fixed electrode section, and the electrostatic capacity between the movable electrode section and the second fixed electrode section are equal in a state in which acceleration is not applied. However, since a wiring and a terminal which are connected to the movable electrode section, and a wiring and a terminal which are connected to the first and second fixed electrode sections get tangled in an angular velocity sensor according to JP-A-2013-127436, there is a discrepancy between the electrostatic capacity when viewed between the terminal which is connected to the movable electrode section and the terminal which is connected to the first fixed electrode section, and the electrostatic capacity when viewed between the terminal which is connected to the movable electrode section and the terminal which is connected to the second fixed electrode section. According to the size of the discrepancy, there is a problem that the discrepancy cannot be adjusted in an IC (exceeds the adjustment range of the IC), and the yield of the acceleration sensor is reduced.

SUMMARY

An advantage of some aspects of the invention is to provide a physical quantity sensor, a physical quantity sensor apparatus, an electronic device, and a mobile body which are able to reduce discrepancy of electrostatic capacity are provided.

The invention can be realized in the following examples.

APPLICATION EXAMPLE 1

According to this application example, there is provided a physical quantity sensor including: a first structure which has a movable section that includes movable electrode fingers; a second structure which includes first fixed electrode fingers that are arranged to oppose the movable electrode fingers; a third structure which includes second fixed electrode fingers that are arranged to oppose the movable electrode fingers; and an electrostatic capacity forming section which has at least one of a first electrostatic capacity forming section that forms an electrostatic capacity between the first structure and the second structure, and a second electrostatic capacity forming section that forms an electrostatic capacity between the first structure and the third structure.

In this manner, it is possible to reduce (preferably make zero) the difference (discrepancy) between an electrostatic capacity between the first structure and the second structure, and an electrostatic capacity between the first structure and the third structure by including the first electrostatic capacity forming section and the second electrostatic capacity forming section.

APPLICATION EXAMPLE 2

In the physical quantity sensor of this application example, it is preferable that the electrostatic capacity forming section has both the first electrostatic capacity forming section and the second electrostatic capacity forming section, and the electrostatic capacity in the first electrostatic capacity forming section and the electrostatic capacity in the second electrostatic capacity forming section are different.

Thereby, it is possible to effectively reduce the difference between the electrostatic capacity between the first structure and the second structure, and the electrostatic capacity between the first structure and the third structure.

APPLICATION EXAMPLE 3

In the physical quantity sensor of this application example, it is preferable that the first structure has the movable section, and a support section which supports the movable section, the support section has an extending section which extends from the support section and where a leading end section opposes the first fixed electrode fingers, and the first electrostatic capacity forming section is configured by being opposed to the extending section and the first fixed electrode fingers. Thereby, the configuration of the first electrostatic capacity forming section is simplified.

APPLICATION EXAMPLE 4

In the physical quantity sensor of this application example, it is preferable that the first structure has the movable section, and a support section which supports the movable section, the support section has an extending section which extends from the support section and where a leading end section opposes the second fixed electrode fingers, and the second electrostatic capacity forming section is configured by being opposed to the extending section and the second fixed electrode fingers. Thereby, the configuration of the second electrostatic capacity forming section is simplified.

APPLICATION EXAMPLE 5

In the physical quantity sensor of this application example, it is preferable that the second structure has a plurality of first fixed electrode fingers, and a connecting section which is arranged to pass through the periphery of the support section, and connects the plurality of first fixed electrode fingers, and the first electrostatic capacity forming section is configured by being opposed to the connecting section and the support section. Thereby, the configuration of the first electrostatic capacity forming section is simplified.

APPLICATION EXAMPLE 6

In the physical quantity sensor of this application example, it is preferable that the third structure has a plurality of second fixed electrode fingers, and a connecting section which is arranged to pass through the periphery of the support section, and connects the plurality of second fixed electrode fingers, and the second electrostatic capacity forming section is configured by being opposed to the connecting section and the support section. Thereby, the configuration of the second electrostatic capacity forming section is simplified.

APPLICATION EXAMPLE 7

In the physical quantity sensor of this application example, it is preferable that the first structure has the movable section, and a wiring which is electrically connected to the movable section, and the first electrostatic capacity forming section is configured to intersect with the wiring and the second structure. Thereby, the configuration of the first electrostatic capacity forming section is simplified.

APPLICATION EXAMPLE 8

In the physical quantity sensor of this application example, it is preferable that the first structure has the movable section and a wiring which is electrically connected to the movable section, and the second electrostatic capacity forming section be configured by intersecting with the wiring and the third structure. Thereby, the configuration of the second electrostatic capacity forming section is simplified.

APPLICATION EXAMPLE 9

The physical quantity sensor apparatus of this application example has the physical quantity sensor of the above application examples and an electronic component which is electrically connected to the physical quantity sensor. Thereby, a physical quantity sensor apparatus with high reliability can be obtained.

APPLICATION EXAMPLE 10

The electronic device of this application example has the physical quantity sensor of the above application examples. Thereby, an electronic device with high reliability is possible.

APPLICATION EXAMPLE 11

The mobile body of this application example has the physical quantity sensor of the above application examples. Thereby, a mobile body with high reliability is possible.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
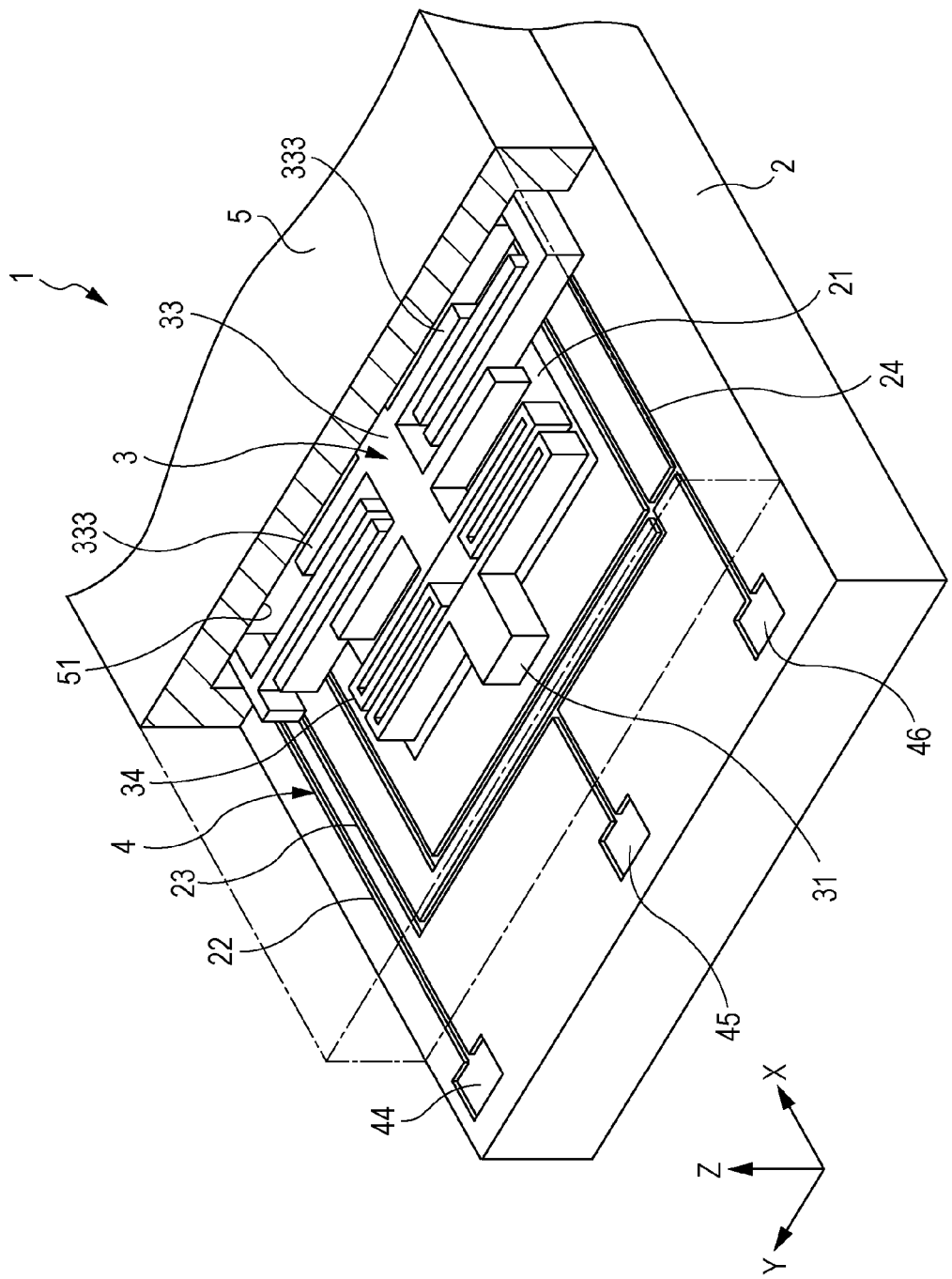
FIG. 1 is a perspective diagram illustrating a physical quantity sensor according to a first embodiment of the invention.

A physical quantity sensor, a physical quantity sensor apparatus, an electronic device, and a mobile body of the invention will be described below in detail based on the embodiments which are illustrated in the drawings.

1. Physical Quantity Sensor

First Embodiment

Figure 2:
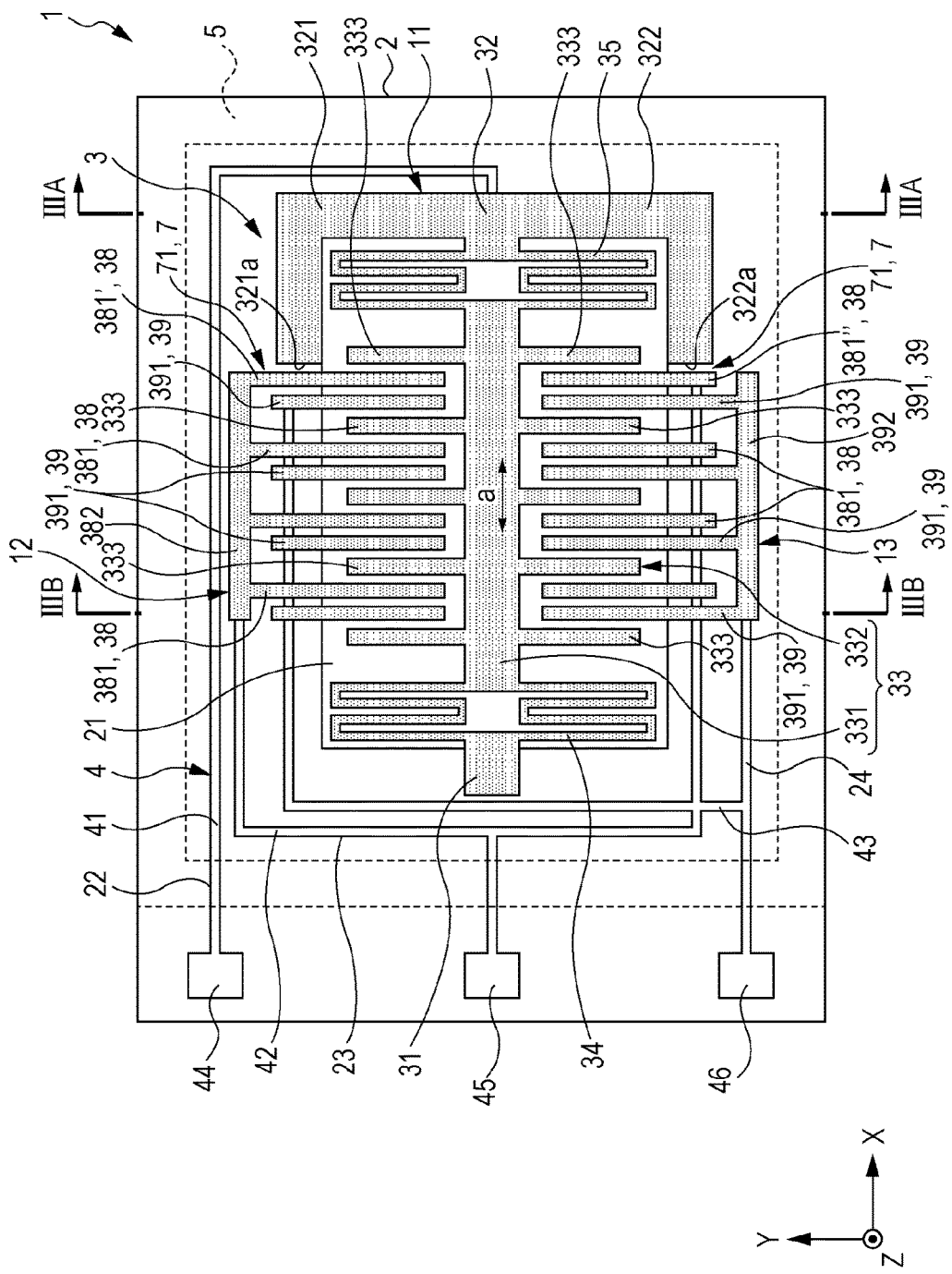
FIG. 2 is a planar diagram illustrating the physical quantity sensor indicated in FIG. 1.
Figure 3A:
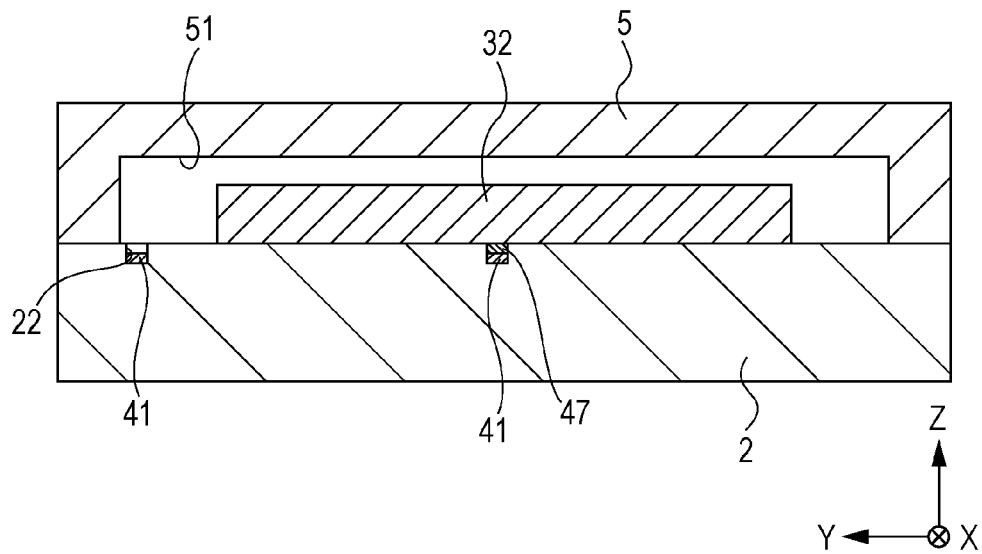
FIG. 3A is a sectional diagram taken along line IIIA-IIIA in FIG. 2.
Figure 3B:
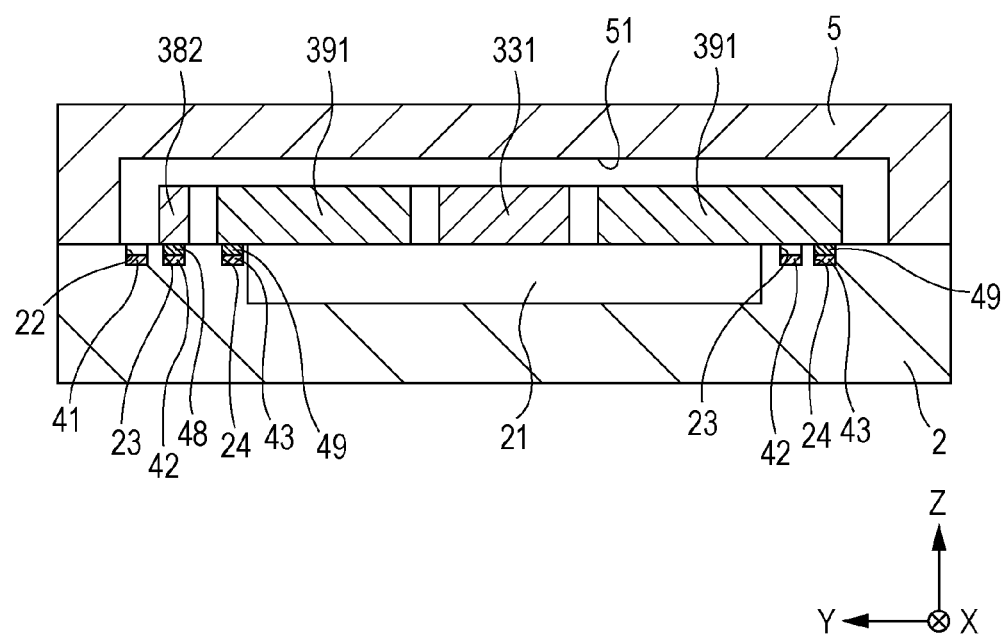
FIG. 3B is a sectional diagram taken along line IIIB-IIIB in FIG. 2.

FIG. 1 is a perspective diagram illustrating the physical quantity sensor according to a first embodiment of the invention. FIG. 2 is a planar diagram illustrating the physical quantity sensor indicated in FIG. 1. FIG. 3A is a sectional diagram along line IIIA-IIIA in FIG. 2, and FIG. 3B is a sectional diagram along line IIIB-IIIB in FIG. 2. Here, for convenience of explanation, hereinafter the paper front side is referred to as "upper" and the paper rear side is referred to as "lower" in FIG. 2. In addition, in each drawing, the X axis, the Y axis, and the Z axis are illustrated as three axes which are orthogonal to one another. In addition, hereinafter a direction parallel to the X axis is referred to as an "X axis direction", a direction parallel to the Y axis is referred to as a "Y axis direction", and a direction parallel to the Z axis is referred to as a "Z axis direction".

A physical quantity sensor 1 which is shown in FIG. 1 and FIG. 2 is able to be used as, for example, an inertial sensor, and in detail, is able to be utilized as an acceleration sensor for measuring acceleration in the X axis direction. Such a physical quantity sensor 1 has a base substrate 2, an element chip 3 which is joined to and supported on the base substrate 2, a conductor pattern 4 which is electrically connected to the element chip 3, and a lid member 5 which is included so as to cover the element chip 3. Each section which configures the physical quantity sensor 1 will be described below in order in detail.

Base Substrate

The base substrate 2 has a plate form, and includes a cavity section (concave section) 21 which opens to the upper surface of the base substrate 2. The cavity section 21 is formed so as to contain (include) a movable section 33, which will be described later, of the element substrate 3, and linking sections 34 and 35 when the base substrate 2 is in planar view. Such a cavity section 21 is configured by a clearance section which prevents the movable section 33 of the element chip 3, and the linking sections 34 and 35 coming into contact with the base substrate 2. Here, the clearance section may be an opening section which the base substrate 2 passes through in the thickness direction thereof in addition to the cavity section 21.

In addition, concave sections 22, 23, and 24 are each included along the outer periphery of the cavity section 21 on the upper surface of the base substrate 2. Then, the conductor pattern 4 is arranged inside the concave sections 22, 23, and 24. In detail, a wiring 41 and a terminal 44 of the conductor pattern 4 are arranged inside the concave section 22, a wiring 42 and a terminal 45 of the conductor pattern 4 are arranged inside the concave section 23, and a wiring 43 and a terminal 46 of the conductor pattern 4 are arranged inside the concave section 24.

In detail, as the configuration material of such a base substrate 2, it is preferable to use a glass material or a silicon material with high resistance, in particular, in a case where the element chip 3 is configured of a silicon material as a main material, it is preferable to use a glass material which includes alkali metal ions (movable ions) (for example, a borosilicate glass such as Pyrex glass (registered trademark)). Thereby, in a case where the element chip 3 is configured by silicon as the main material, anodic bonding of the base substrate 2 and the element chip 3 is possible.

Element Chip

The element chip 3 has support sections 31 and 32, the movable section 33, the linking sections 34 and 35, and first and second fixed electrode sections 38 and 39. In addition, the movable section 33 has a base section 331 and a movable electrode section 332. In addition, the support sections 31 and 32, the movable section 33, and the linking sections 34 and 35 are integrally formed.

Such an element chip 3 is displaced in the X axis direction (+X axis direction or −X axis direction) while the movable section 33 elastically deforms the linking sections 34 and 35 according to a change of acceleration. Along with such displacement, a gap between the movable electrode section 332 and a first fixed electrode section 38, and the gap between the movable electrode section 332 and a second fixed electrode section 39 change respectively. Along with such displacement, the sizes of an electrostatic capacity C1 between the movable electrode section 332 and the first fixed electrode section 38, and an electrostatic capacity C2 between the movable electrode section 332 and the second fixed electrode section 39 change respectively. Accordingly, the physical quantity sensor 1 detects acceleration based on the change of the electrostatic capacities C1 and C2.

In addition, the support sections 31 and 32 are joined to the base substrate 2. In detail, the support section 31 is joined to a portion at the −X axis direction side with respect to the cavity section 21 on the upper surface of the base substrate 2, while the support section 32 is joined to a portion at the +X axis direction side with respect to the cavity section 21 on the upper surface of the base substrate 2.

In the present embodiment, the form of the support sections 31 and 32 are different, and in particular, the support section 32 has a pair of extending sections 321 and 322 which extend to both sides in the Y axis direction. The extending section 321 extends in the +Y axis direction, and a leading end extends toward the −X axis direction by being bent substantially perpendicularly in the middle. In the same manner, the extending section 322 extends in the −Y axis direction, and a leading end extends toward the −X axis direction by being bent substantially perpendicularly in the middle. The extending sections 321 and 322 are parts which it is possible to use to adjust an offset of capacitance by forming electrostatic capacity with the first fixed electrode section 38, but this will be described in detail later.

The movable section 33 is included between the two support sections 31 and 32. The movable section 33 is linked to the support section 31 via the linking section 34, and is linked to the support section 32 via the linking section 35. In further detail, one end section of the base section 331 is linked to the support section 31 via the linking section 34, and another end section of the base section 331 is linked to the support section 32 via the linking section 35. The linking sections 34 and 35 link the movable section 33 so as to be displaceable with respect to the support sections 31 and 32. In the present embodiment, as shown by directional arrow a in FIG. 2, the linking sections 34 and 35 are configured so as to be able to displace the movable section 33 in the X axis direction (the +X axis direction or the −X axis direction).

In this manner, the movable electrode section 332 is included at both end sides (the ±Y axis directions) in the width direction of the base section 331 which is supported so as to be displaceable in the X axis direction with respect to the base substrate 2. The movable section 332 protrudes in the Y axis direction from the base section 331, and includes a plurality of movable electrode fingers 333 which are lined up along the X axis direction so as to have a comb-tooth form. In addition, the movable electrode fingers 333 are included so as to oppose at intervals with respect to the first and second fixed electrode sections 38 and 39.

The first fixed electrode section 38 is arranged on one side (the −X axis direction side) of each movable electrode finger 333, and has a plurality of first fixed electrode fingers 381 which are lined up so as to have a comb-tooth form and mesh at intervals with respect to the corresponding movable electrode fingers 333. Base end sections (the end sections at the opposite side to the movable section 33) of such a plurality of first fixed electrode fingers 381 are joined to the upper surface of the base substrate 2. In addition, the plurality of first fixed electrode fingers 381 which are positioned at the +Y axis direction side are mechanically and electrically connected by a linking section 382 which extends in the X axis direction. Meanwhile, the plurality of first fixed electrode fingers 381 which are positioned at the −Y axis direction side are arranged individually from one another.

In contrast to this, the second fixed electrode section 39 is arranged on the other side (the +X axis direction side) of each movable electrode finger 333, and has a plurality of second fixed electrode fingers 391 which are lined up so as to have a comb-tooth form and mesh at intervals with respect to the corresponding movable electrode fingers 333. Base end sections (the end sections at the opposite side to the movable section 33) of such a plurality of second fixed electrode fingers 391 are joined to the upper surface of the base substrate 2. In addition, the plurality of second fixed electrode fingers 391 which are positioned at the −Y axis direction side are mechanically and electrically connected by a linking section 392 which extends in the X axis direction. Meanwhile, the plurality of second fixed electrode fingers 391 which are positioned at the +Y axis direction side are arranged individually from one another.

As long as detection of physical quantity is possible based on the change of electrostatic capacity such as described above, the configuration material of such an element chip 3 is not particularly limited, but a semiconductor is preferable, and in detail, it is preferable to use, for example, a silicon material such as single crystal silicon, or polysilicon. Since it is possible to process the silicon material with high precision by etching, the dimension precision of the element chip 3 is superior due to the element chip 3 being configured by silicon as the main material, and as a result, it is possible to design the physical quantity sensor 1 with high sensitivity. In addition, since silicon fatigue is small, it is also possible to improve durability of the physical quantity sensor 1. In addition, it is preferable for impurities such as phosphorus and boron in the silicon material, which configures the element chip 3, to be doped. Thereby, it is possible to set superior conductivity of the element chip 3.

The joining method of the element substrate 3 and the base substrate 2 is not particularly limited, but it is preferable to configure the element chip 3 of silicon as the main material as described above, and use an anodic bonding method in a case where the base substrate 2 is configured by a glass material which includes alkali metal ions. Thereby, it is possible to firmly join the element substrate 3 to the base substrate 2. For this reason, it is possible to improve impact resistance of the physical quantity sensor 1. In addition, it is possible to join the element substrate 3 at a desired position of the base substrate 2 with high precision. For this reason, it is possible to design the physical quantity sensor 1 with high sensitivity.

Conductor Pattern

Figure 4:
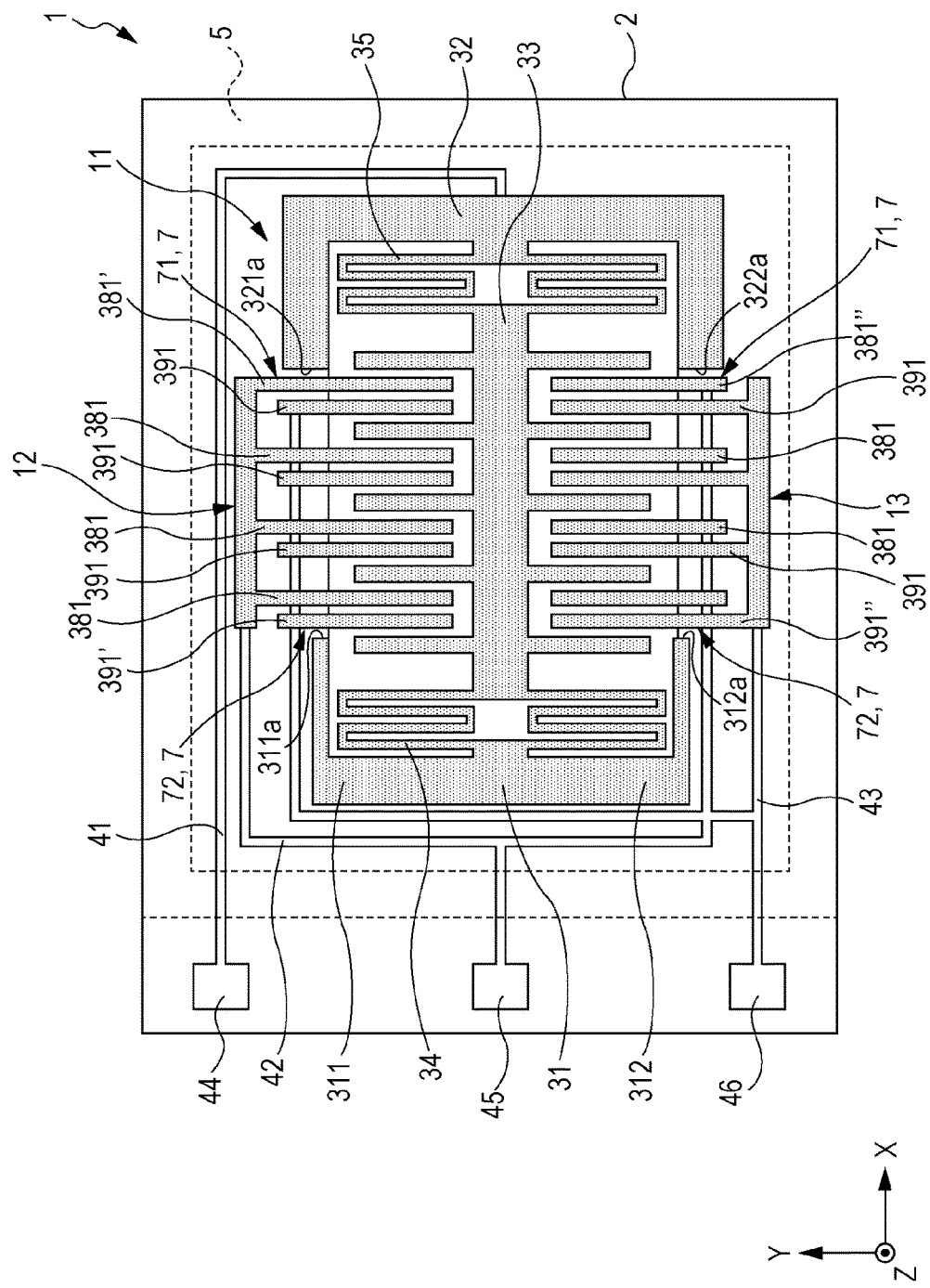
FIG. 4 is a planar diagram illustrating a physical quantity sensor according to a second embodiment of the invention.
Figure 5:
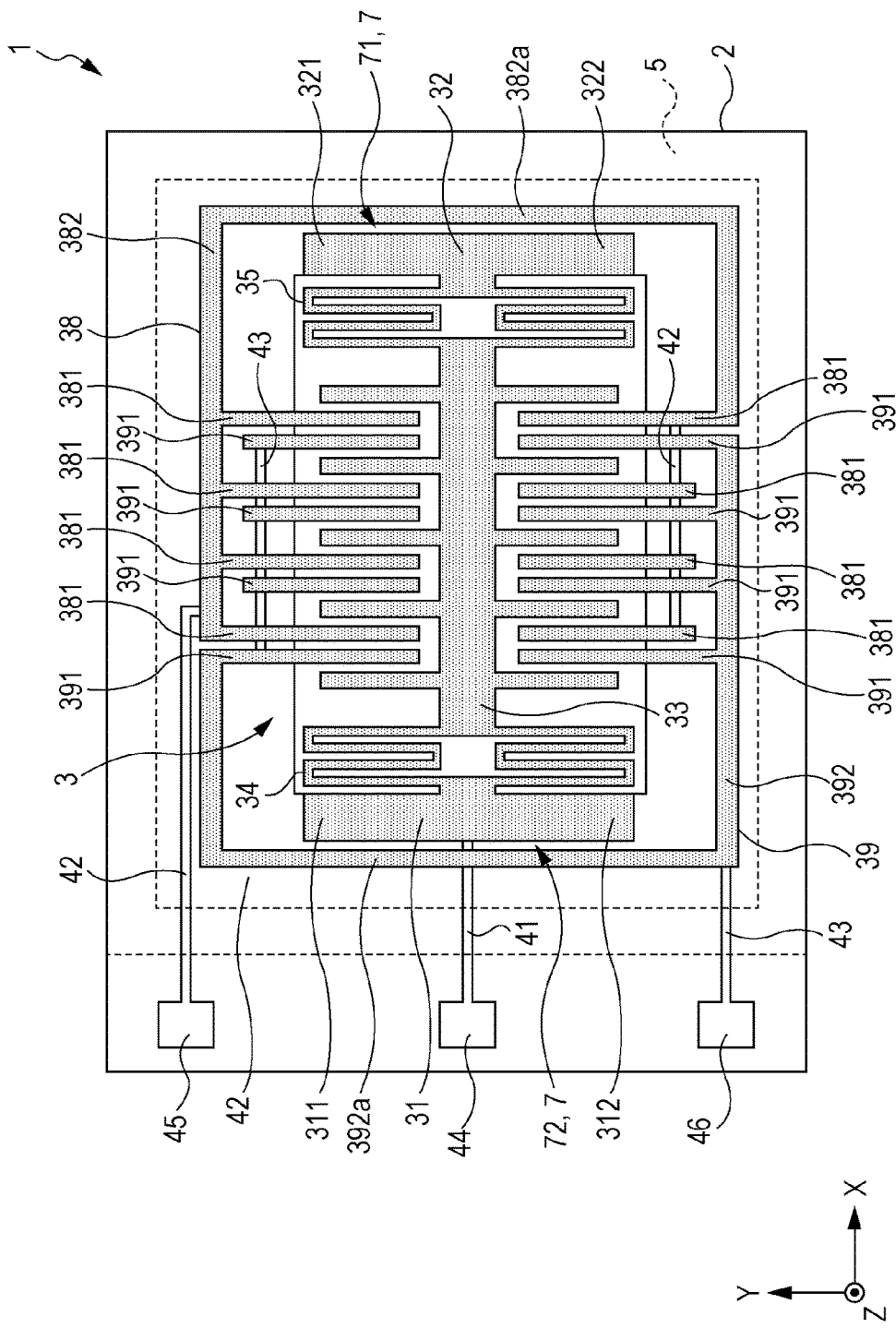
FIG. 5 is a planar diagram illustrating a physical quantity sensor according to a third embodiment of the invention.
Figure 6:
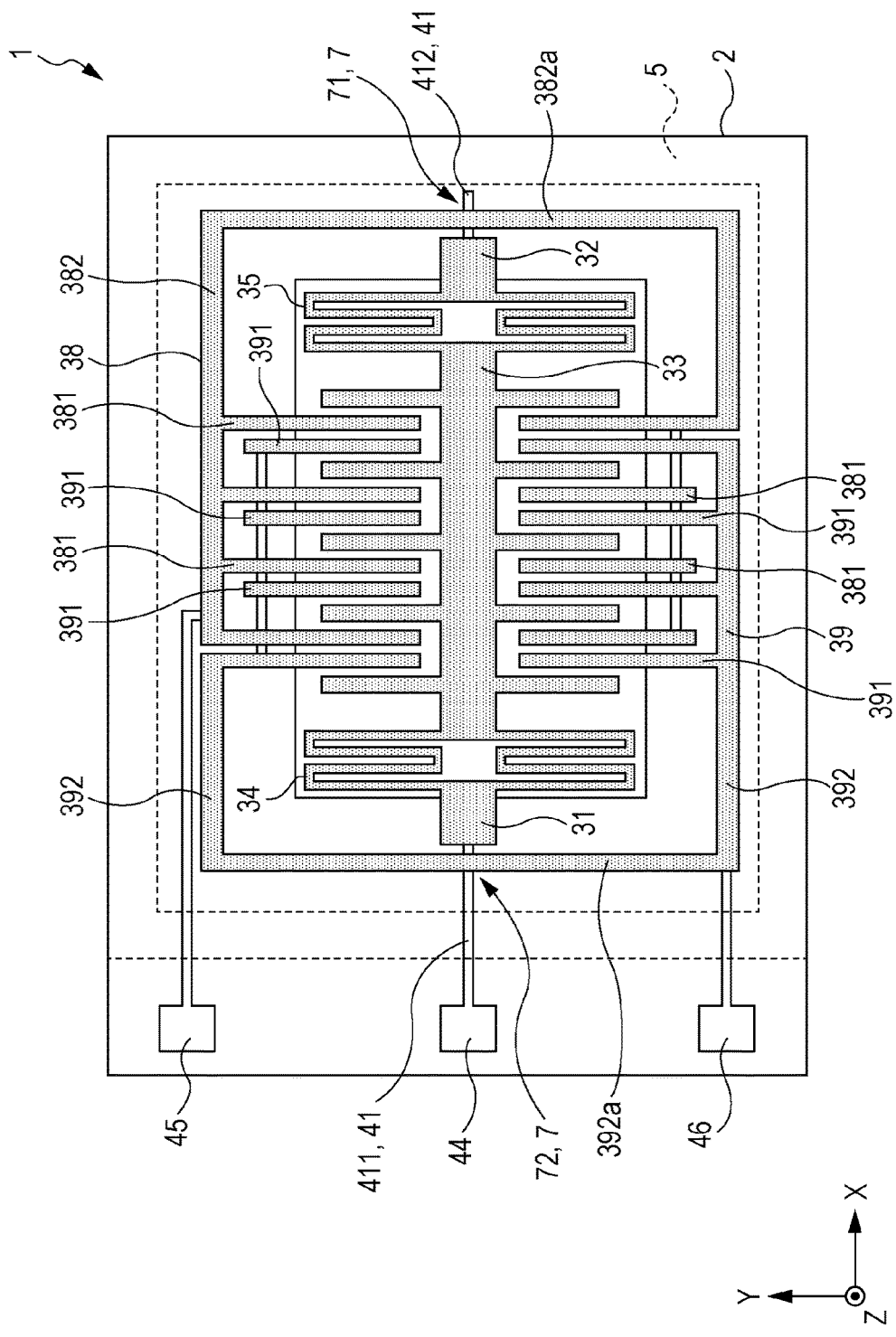
FIG. 6 is a planar diagram illustrating a physical quantity sensor according to a fourth embodiment of the invention.

The conductor pattern 4 is included inside the concave sections 22, 23, and 24 on the base substrate 2. As shown in FIG. 4 to FIG. 6, the conductor pattern 4 has the wiring 41 and the terminal 44 which are included inside the concave section 22, the wiring 42 and the terminal 45 which are included inside the concave section 23, and the wiring 43 and the terminal 46 which are included inside the concave section 24.

The wiring 41 is included outside the cavity section 21 of the base substrate 2, and is formed along the outer periphery of the cavity section 21. Then, one end section of the wiring 41 is connected to the terminal 44 in the outer peripheral section of the base substrate 2 (a portion on the outside of the lid member 5). In addition, as shown in FIG. 3A, another end section of the wiring 41 is electrically connected to the support section 32 (the movable electrode fingers 333) via a conductive member (a bump) 47.

The wiring 42 is included outside the cavity section 21 of the base substrate 2, and is formed along the outer periphery of the cavity section 21. Then, one end section of the wiring 42 is connected to the terminal 45 in the outer peripheral section of the base substrate 2 (a portion on the outside of the lid member 5). In addition, as shown in FIG. 3B, the wiring 42 is electrically connected to the first fixed electrode fingers 381 via a conductive member (a bump) 48.

In addition, the wiring 43 is included outside the cavity section 21 of the base substrate 2, and is formed along the outer periphery of the cavity section 21. Then, one end section of the wiring 43 is connected to the terminal 46 in the outer peripheral section of the base substrate 2 (a portion on the outside of the lid member 5). In addition, as shown in FIG. 3B, the wiring 43 is electrically connected to the second fixed electrode fingers 391 via a conductive member (a bump) 49.

Here, as shown in FIG. 2, the wirings 42 and 43 intersect one another in the middle. For this reason, an insulation treatment is carried out at the intersection where an insulation material is interposed between the wiring 42 and the wiring 43 or the like. In addition, a gap (that is, a linking hole which links the inside and the outside of the lid member 5) is formed between the lid member 5 and the wirings 41, 42, and 43, and it is possible to use the gap where pressure inside the lid member 5 is adjusted or into which inert gas is filled. The gap may be blocked by a sealing material such as an adhesive after the inside of the lid member 5 is set to a prescribed atmosphere.

As long as the materials each have conductivity, the configuration materials of such wirings 41 to 43 and terminals 44 to 46 are not particularly limited, but, for example, examples are given such as an oxide (a transparent electrode material) of ITO (indium tin oxide), IZO (indium zinc oxide), $In_3O_3$, $SnO_2$, $SnO_2$ containing Sb, ZnO containing Al, or the like, Au, Pt, Ag, Cu, Al, or an alloy including these, and from these it is possible to use one type, or two or more in combination.

It is possible to measure the electrostatic capacity C1 between the movable electrode section 332 and the first fixed electrode fingers 381 from between the terminals 44 and 45, and it is possible to measure the electrostatic capacity C2 between the movable electrode section 332 and the second fixed electrode fingers 391 from between the terminals 44 and 46 by including the wirings 41, 42, and 43 and the terminals 44, 45, and 46. Then, it is possible to detect the acceleration in the ±X axis directions which is applied to the physical quantity sensor 1 based on the change of the electrostatic capacities C1 and C2.

Lid Member

The lid member 5 has a plate form, and includes a concave section 51 which is open to the lower surface of the lid member 5. In addition, the concave section 51 is formed so as to permit displacement of the movable section 33 of the element chip 3. Then, the lower surface of the lid member 5 is joined to the upper surface of the base substrate 2. The joining method of the lid member 5 and the base substrate 2 is not particularly limited, but, for example, it is possible to use a joining method which uses an adhesive, an anodic bonding method, a direct joining method, and the like. In addition, as long as it is possible to exhibit the function as described above, the configuration material of the lid member 5 is not particularly limited, but, for example, it is possible to appropriately use a silicon material, a glass material, or the like. Here, in a state in which only the lid member 5 is joined to the base substrate 2, the inside and the outside of the internal space S are linked via the concave sections 22, 23, and 24 which are formed on the base substrate 2. For this reason, although not shown in the drawings, the concave sections 22, 23, and 24 are sealed by an $SiO_2$ film which is formed using a TEOSCVD method or the like, and thereby, the internal space S is hermetically sealed.

The configuration of the physical quantity sensor 1 is described above. Next, the function of the extending sections 321 and 322 which have a support section 32 will be described. As will be described later, for example, an IC chip 102 which includes a detection circuit is connected to the physical quantity sensor 1, and the IC chip 102 detects the applied acceleration (physical quantity) based on the change of the electrostatic capacity C1 between the movable electrode section 332 and the first fixed electrode section 38, and the electrostatic capacity C2 between the movable electrode section 332 and the second fixed electrode section 39. Here, the physical quantity sensor 1 is designed such that the electrostatic capacity C1 and the electrostatic capacity C2 are equal, that is, the offset of the electrostatic capacities C1 and C2 become zero in a natural state in which acceleration is not applied. It is possible to further accurately detect received acceleration by measuring in such a manner. Meanwhile, in a case where there is a slight discrepancy between the electrostatic capacity C1 and electrostatic capacity C2 according to the problem of manufacturing precision or the like, it is possible to accurately detect by correcting the offset of the electrostatic capacities C1 and C2 to zero using a correction circuit or the like inside the IC chip 102.

Here, in reality, since the electrostatic capacity C1 is detected as an electrostatic capacity C1' between the terminals 44 and 45, and the electrostatic capacity C2 is detected as an electrostatic capacity C2' between the terminals 44 and 46, even if the electrostatic capacities C1 and C2 are equal, for example, there are cases where there is a difference between the electrostatic capacity C1' and C2' due to influence of a parasitic capacitance which is formed between the wirings 41 and 42 and the wirings 41 and 43, a parasitic capacitance which is formed between the wiring 41 and the first fixed electrode section 38, and between the wiring 41 and the second fixed electrode section 39, and the like. If a difference ΔC' between the electrostatic capacities C1' and C2' is slight (within a prescribed range), although not becoming a problem where the correction by the IC chip 102 as described above becomes possible, if the difference ΔC' is large (if outside of the prescribed range), correction by the IC chip 102 as described above is not possible. In such a case, it is not possible to guarantee detection precision, and as a result, manufacturing yield of the physical quantity sensor 1 is reduced.

Therefore, In the present embodiment, an electrostatic capacity forming section 7 for forming a capacitance for adjustment is included such that it is possible to suppress the difference ΔC' between the electrostatic capacities C1' and C2' to within a range in which correction by the IC chip 102 is possible, and preferably such that the difference ΔC' is set to zero. That is, the physical quantity sensor 1 has a first structure 11 which includes the support sections 31 and 32, the movable section 33, the linking sections 34 and 35, the wiring 41, and the terminal 44, a second structure 12 which includes the first fixed electrode section 38, the wiring 42, and the terminal 45, a third structure 13 which includes the second fixed electrode section 39, the wiring 43, and the terminal 46, and the electrostatic capacity forming section which sets the difference ΔC' within a range in which correction by the IC chip 102 is possible by forming at least one electrostatic capacity between the first structure and the second structure 12, and between the first structure 11 and the third structure 13. The electrostatic capacity forming section 7 is described below in detail, but below in a state in which the electrostatic capacity forming section 7 is not included, a relationship where electrostatic capacity C2'>electrostatic capacity C1' is satisfied.

As described above, in the state in which the electrostatic capacity forming section 7 is not included, since the relationship where electrostatic capacity C2'>electrostatic capacity C1' is satisfied, the electrostatic capacity forming section 7 has a first electrostatic capacity forming section 71 in order to increase the electrostatic capacity C1'. As shown in FIG. 2, the first electrostatic capacity forming section 71 of the present embodiment is configured to oppose a side surface of the first fixed electrode fingers 381 (381') which are positioned more to the +X axis direction side than a leading end surface 321a of the extending section 321 of the support section 32, and is configured to oppose a side surface of the first fixed electrode fingers 381 (381") which are positioned more to the +X axis direction side than a leading end surface 322a of the extending section 322 of the support section 32.

The two first electrostatic capacity forming sections 71 each come to have a capacitance of a prescribed size by appropriately adjusting the separation distance between the leading end surfaces 321a and 322a and the first fixed electrode fingers 381' and 381", and the areas of the leading end surfaces 321a and 322a (opposing areas of the first fixed electrode fingers 381' and 381").

It is possible to increase the electrostatic capacity C1' and it is possible to reduce the difference ΔC' (preferably to zero) by including such first electrostatic capacity forming sections 71. Consequently, it is possible to suppress the difference ΔC' to within a range in which correction by the IC chip 102 is possible, and the manufacturing yield is improved. Here, in the present embodiment, two first electrostatic capacity forming sections 71 are included, but as long as it is possible to sufficiently reduce the difference ΔC' using one first electrostatic capacity forming section 71, one first electrostatic capacity forming section 71 may be omitted.

The configuration of the first electrostatic capacity forming section 71 is simplified without being accompanied by an excessive increase in size of the apparatus by configuring the first electrostatic capacity forming section 71 as described above. In addition, since it is possible to obtain the extending sections 321 and 322, and the first fixed electrode fingers 381 by etching a silicon substrate, it is possible to control the areas of the leading end surfaces 321a and 322a, and the separation distance between the extending sections 321 and 322, and the first fixed electrode fingers 381 with high precision. For this reason, it is possible suppress a discrepancy from the measurement value of the capacitance of the first electrostatic capacity forming section 71 to be small, and consequently, it is possible to further reduce the difference ΔC'.

Second Embodiment

The second embodiment of a physical quantity sensor of the invention will be described below.

FIG. 4 is a planar diagram illustrating the physical quantity sensor according to the second embodiment of the invention.

The physical quantity sensor according to the present embodiment is the same as the physical quantity sensor according to the first embodiment described above aside from the configuration of the electrostatic capacity forming section which is different.

Here, the description below relates to the physical quantity sensor of the second embodiment, the description focuses on the differences to the embodiment described above, and similar matter is omitted from the description. In addition, the configuration in FIG. 4 which is the same as the embodiment described above is given the same reference numerals.

As shown in FIG. 4, the electrostatic capacity forming section 7 of the physical quantity sensor 1 of the present embodiment has the first electrostatic capacity forming section 71 which forms an electrostatic capacity between the terminals 44 and 45 (the first and second structures 11 and 12), and the second electrostatic capacity forming section 72 which forms an electrostatic capacity between the terminals 44 and 46 (the first and third structures 11 and 13). The configuration of the first electrostatic capacity forming section 71 is the same as in the first embodiment described above. Meanwhile, the second electrostatic capacity forming 72 section is configured as shown below.

That is, in the physical quantity sensor 1 of the present embodiment, the support section 31 has a pair of extending sections 311 and 312 which extend to both sides in the Y axis direction. The extending section 311 extends in the +Y axis direction, and a leading end extends toward the +X axis direction by being bent substantially perpendicularly in the middle. In the same manner, the extending section 312 extends in the −Y axis direction, and a leading end extends toward the +X axis direction by being bent substantially perpendicularly in the middle. Then, one second electrostatic capacity forming section 72 is formed to oppose a leading end surface 311a of the extending section 311 and the side surface of the second fixed electrode fingers 391 (391'), and one second electrostatic capacity forming section 72 is formed to oppose a leading end surface 312a of the extending section 312 and the side surface of the second fixed electrode fingers 391 (391").

Here, in a state in which the electrostatic capacity forming section 7 is not included, since the relationship where electrostatic capacity C2'>electrostatic capacity C1' is satisfied, the capacitance which is formed using the second electrostatic capacity forming section 72 becomes smaller than the capacitance which is formed using the first electrostatic capacity forming section 71 (that is, the capacitances of the first and second electrostatic capacity forming sections 71 and 72 are different). Thereby, it is possible to reduce the difference ΔC' (preferably to zero), and it is possible to suppress the difference ΔC' to within a range in which correction by the IC chip 102 is possible. Consequently, the manufacturing yield is improved.

Here, in the present embodiment, the capacitance which is formed using the second electrostatic capacity forming section 72 is smaller than the capacitance which is formed using the first electrostatic capacity forming section 71 due to the area of the leading end surfaces 311a and 312a being smaller than the area of the leading end surfaces 321a and 322a, but in addition, the capacitance which is formed using the second electrostatic capacity forming section 72 may be smaller than the capacitance which is formed using the first electrostatic capacity forming section 71 due to the separation distance between the leading end surfaces 311a and 312a and the second fixed electrode fingers 391' and 391" being wider than the separation distance between the leading end surfaces 321a and 322a and the first fixed electrode fingers 381' and 381". In addition, two of each of the first and second electrostatic capacity forming sections 71 and 72 are included, but the number is not limited thereto, either one may be omitted, or in contrast, one or more may be added.

In this manner, it is possible to maintain mechanical strength of the support section 32 by the electrostatic capacity forming section 7 including the first and second electrostatic capacity forming sections 71 and 72. When describing in detail, as shown in the first embodiment, for example, in a case where only the first electrostatic capacity forming section 71 is included, assuming a case where the difference ΔC' in a state in which the electrostatic capacity forming section 7 is not included is not so large, it is necessary, for example, to reduce the leading end surfaces 321a and 322a in order to suppress the capacitance, which is formed using the first electrostatic capacity forming section 71, to be small. By doing this, there is a concern that the extending sections 321 and 322 become narrower, and the support section 32 is damaged due to an impact or the like. In contrast to this, in the present embodiment, when the second electrostatic capacity forming section 72 is included in addition to the first electrostatic capacity forming section 71, it is necessary to widen the leading end surfaces 321a and 322a of the extending sections 321 and 322 by a portion in which the increased capacitance is offset by the second electrostatic capacity forming section 72. For this reason, it is possible to sufficiently thicken the extending sections 321 and 322 and the mechanical strength is sufficiently maintained.

It is possible for similar effects to those in the first embodiment described above to also be exhibited in the second embodiment.

Third Embodiment

Next, a third embodiment of a physical quantity sensor of the invention will be described.

FIG. 5 is a planar diagram illustrating the physical quantity sensor according to the third embodiment of the invention.

The physical quantity sensor according to the present embodiment is the same as the physical quantity sensor according to the first embodiment described above aside from the configuration of the electrostatic capacity forming section which is different.

Here, the description below relates to the physical quantity sensor of the third embodiment, the description focuses on the differences to the embodiment described above, and similar matter is omitted from the description. In addition, the configuration in FIG. 5 which is the same as the embodiment described above is given the same reference numerals.

In the physical quantity sensor 1 of the present embodiment, each of the extending sections 311 and 312 of the support section 31 extend in the Y axis direction, and are not bent in the X axis direction in the middle in the manner of the second embodiment described above. In the same manner, each of the extending sections 321 and 322 of the support section 32 extend in the Y axis direction, and are not bent in the X axis direction in the middle in the manner of the second embodiment described above.

In addition, the first fixed electrode section 38 has a plurality of first fixed electrode fingers 381, and the linking section 382 which links all of the first fixed electrode fingers 381 that are positioned at the +Y axis direction side and the first fixed electrode fingers 381 that are positioned furthest to the +X axis direction side out of the first fixed electrode fingers 381 that are positioned at the −Y axis direction side. Here, the first fixed electrode fingers 381 which are not linked to the linking section 382 out of the first fixed electrode fingers 381 that are positioned at the −Y axis direction side are connected to the linking section 382 via the wiring 42 and a conductive member 48 (which is not shown in the drawings).

The linking section 382 has a portion 382a which extends in the Y axis direction so as to pass through the vicinity of the +X side of the support section 32. Then, the first electrostatic capacity forming section 71 is formed to oppose the portion 382a and the support section 32. Here, for example, it is possible to adjust the capacitance of the first electrostatic capacity forming section 71 by appropriately adjusting the separation distance between the portion 382a and the support section 32, and the length of the extending sections 321 and 322.

In the same manner, the second fixed electrode section 39 has a plurality of second fixed electrode fingers 391, and the linking section 392 which links all of the second fixed electrode fingers 391 that are positioned at the −Y axis direction side and the second fixed electrode fingers 391 that are positioned furthest to the −X axis direction side out of the second fixed electrode fingers 391 that are positioned at the +Y axis direction side. Here, the second fixed electrode fingers 391 which are not linked to the linking section 392 out of the second fixed electrode fingers 391 that are positioned at the +Y axis direction side are connected to the linking section 392 via the wiring and a conductive member 49 (which is not shown in the drawings).

The linking section 392 has a portion 392a which extends in the Y axis direction so as to pass through the vicinity of the −X side of the support section 31. Then, the second electrostatic capacity forming section 72 is formed to oppose the portion 392a and the support section 31. Here, for example, it is possible to adjust the capacitance of the second electrostatic capacity forming section 72 by appropriately adjusting the separation distance between the portion 392a and the support section 31, and the length of the extending sections 311 and 312.

The configuration of the first electrostatic capacity forming section 71 is simplified by configuring the first electrostatic capacity forming section 71 as described above. In addition, since it is possible to secure wide opposing areas of the support section 32 and the portion 382a, the adjustment range of the electrostatic capacity C1 becomes wide. The same can also be said of the second electrostatic capacity forming section 72.

It is possible for similar effects to those in the first embodiment to also be exhibited in the third embodiment.

Fourth Embodiment

Next, a fourth embodiment of a physical quantity sensor of the invention will be described below.

FIG. 6 is a planar diagram illustrating a physical quantity sensor according to the fourth embodiment of the invention.

The physical quantity sensor according to the present embodiment is the same as the physical quantity sensor according to the third embodiment described above aside from the configuration of the electrostatic capacity forming section which is different.

Here, the description below relates to the physical quantity sensor of the fourth embodiment, the description focuses on the differences to the third embodiment described above, and similar matter is omitted from the description. In addition, the configurations in FIG. 6 and FIG. 7 which are the same as the embodiment described above are given the same reference numerals.

As shown in FIG. 6, in the physical quantity sensor 1 of the present embodiment, the extending sections 311 and 312 are omitted from the support section 31, and the extending sections 321 and 322 are omitted from the support section 32. In addition, the wiring 41 has a first wiring section 411 which connects the support section 32 and the terminal 44, and a second wiring section 412 which extends from the support section 32 in the +X axis direction. Then, the first electrostatic capacity forming section 71 is formed by the second wiring section 412 and the portion 382a of the linking section 382 overlapping, and the second electrostatic capacity forming section 72 is formed by the first wiring section 411 and the portion 392a of the linking section 392 overlapping. Here, for example, it is possible to adjust the capacitance of the first electrostatic capacity forming section 71 by appropriately adjusting the separation distance between the second wiring section 412 and the portion 382a, and the width (the length in the X axis direction) of the portion 382a. The same can also be said of the second electrostatic capacity forming section 72.

The configuration of the first and second electrostatic capacity forming sections 71 and 72 is simplified by configuring the first and second electrostatic capacity forming sections 71 and 72 as described above.

It is possible for similar effects to those in the first embodiment described above to also be exhibited in the fourth embodiment.

2. Physical Quantity Sensor Apparatus

Next, a physical quantity sensor apparatus of the invention will be described.

Figure 7:
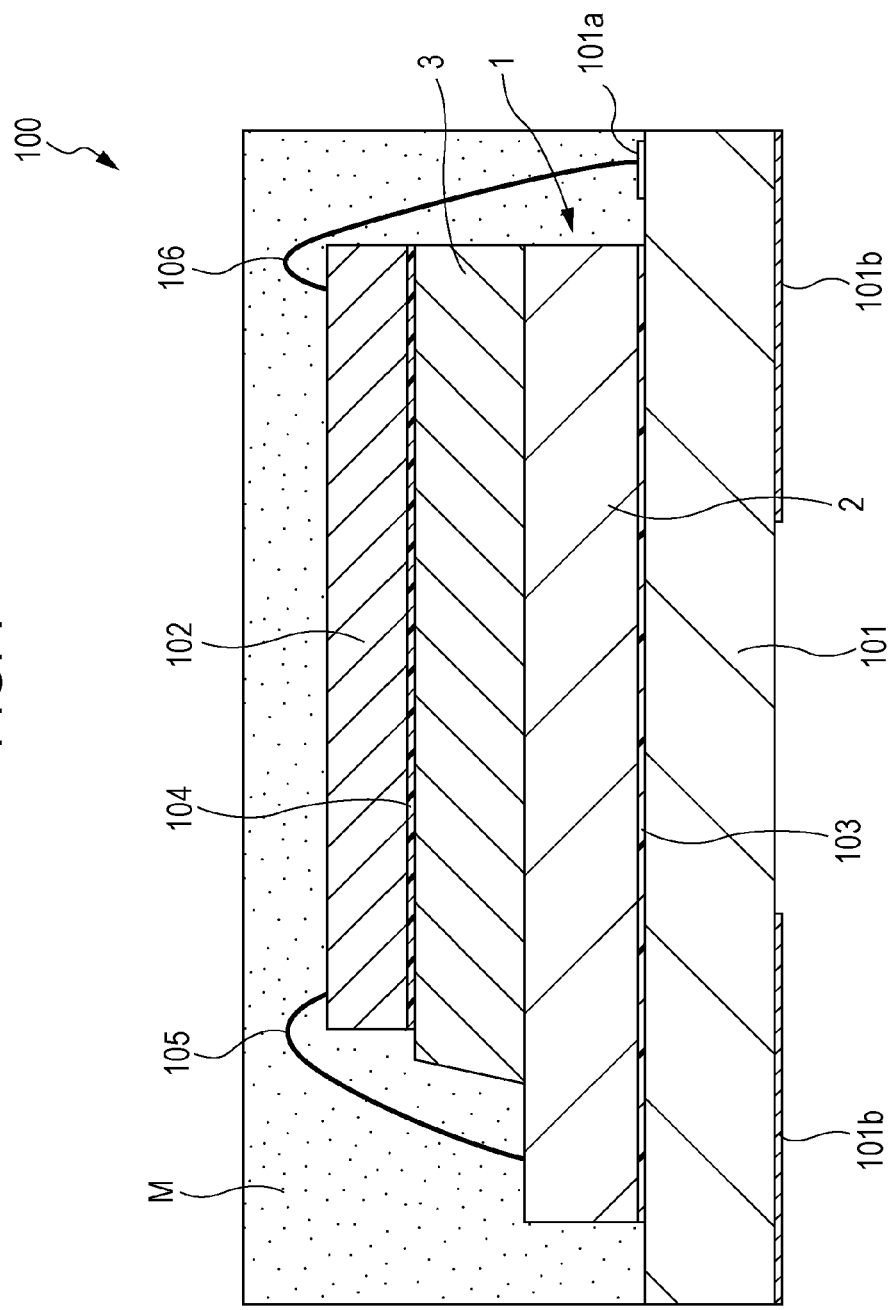
FIG. 7 is a schematic diagram illustrating an example of a physical quantity sensor apparatus of the invention.

FIG. 7 is a schematic diagram illustrating an example of the physical quantity sensor of the invention. The physical quantity sensor apparatus 100 which is shown in FIG. 7 has a substrate 101, the physical quantity sensor 1 which is fixed to the upper surface of the substrate 101 via an adhesive layer 103, and the IC chip (an electronic component) 102 which is fixed to the upper surface of the physical quantity sensor 1 via an adhesive layer 104. Then, the physical quantity sensor 1 and the IC chip 102 are molded by a mold material M in a state in which the lower surface of the substrate 101 is exposed. Here, it is possible to use, for example, solder, silver paste, a resin-based adhesive (a die attaching agent), or the like as the adhesive layers 103 and 104. In addition, it is possible to use, for example, a thermosetting epoxy resin as the mold material M, and it is possible, for example, to mold using a transfer molding method.

In addition, a plurality of terminals 101a are arranged on the upper surface of the substrate 101, and a plurality of mounting terminals 101b, which are connected to the terminal 101a via an internal wiring or a castellation which are not shown in the drawings, is arranged at the lower surface. The material of the substrate 101 is not particularly limited, but, for example, it is possible to use a silicon substrate, a ceramic substrate, a resin the like.

In addition, for example, a driving circuit which drives the physical quantity sensor 1, a detection circuit which detects acceleration from a differential signal, an output circuit which converts and outputs the signal from the detection circuit to a prescribed signal, and the like are included in the IC chip 102. Such an IC chip 102 is electrically connected to the terminals 44, 45, and 46 of the physical quantity sensor 1 via a bonding wire 105, and is electrically connected to the terminal 101a of the substrate 101 via a bonding wire 106.

Such a physical quantity sensor apparatus 100 includes the physical quantity sensor 1, and therefore has superior reliability.

3. Electronic Device

Next, an electronic device of the invention will be described.

Figure 8:
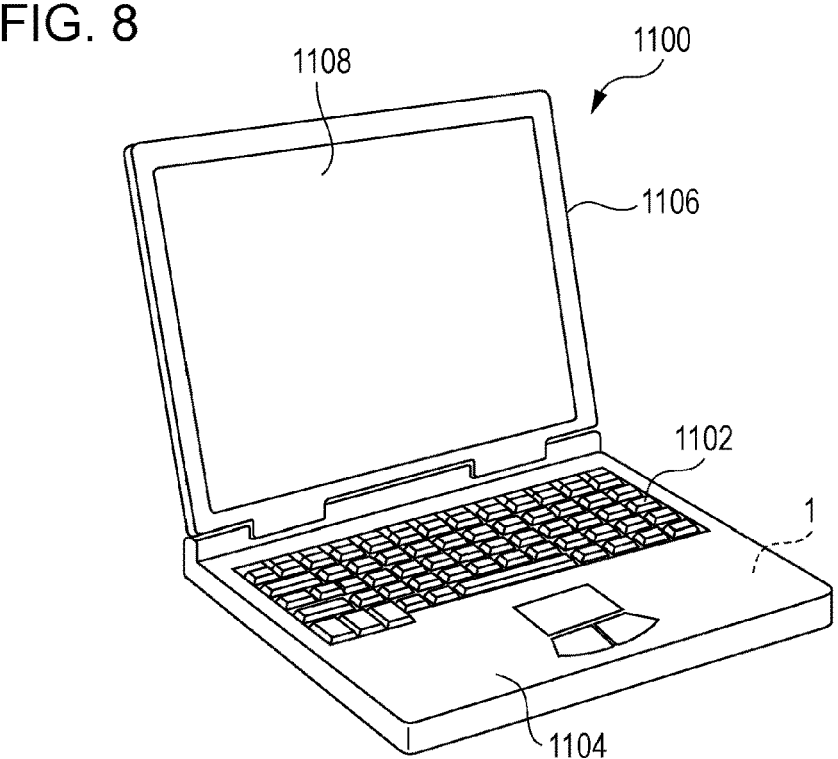
FIG. 8 is a perspective diagram illustrating a configuration of a mobile-type (or a notebook-type) personal computer to which an electronic device of the invention is applied.

FIG. 8 is a perspective diagram illustrating a configuration of a mobile-type (or a notebook-type) personal computer to which the electronic device of the invention is applied.

In this drawing, a personal computer 1100 is configured by a main body section 1104 which includes a keyboard 1102, and a display unit 1106 which includes a display section 1108, and the display unit 1106 is supported so as to be able to rotate via a hinge structure section with respect to the main body section 1104. The physical quantity sensor 1, which measures the physical quantity of acceleration, angular velocity, and the like in order to measure falling or inclination of such a personal computer 1100, is mounted in the personal computer 1100. In this manner, it is possible to obtain the personal computer 1100 with high reliability by mounting the physical quantity sensor 1 described above.

Figure 9:
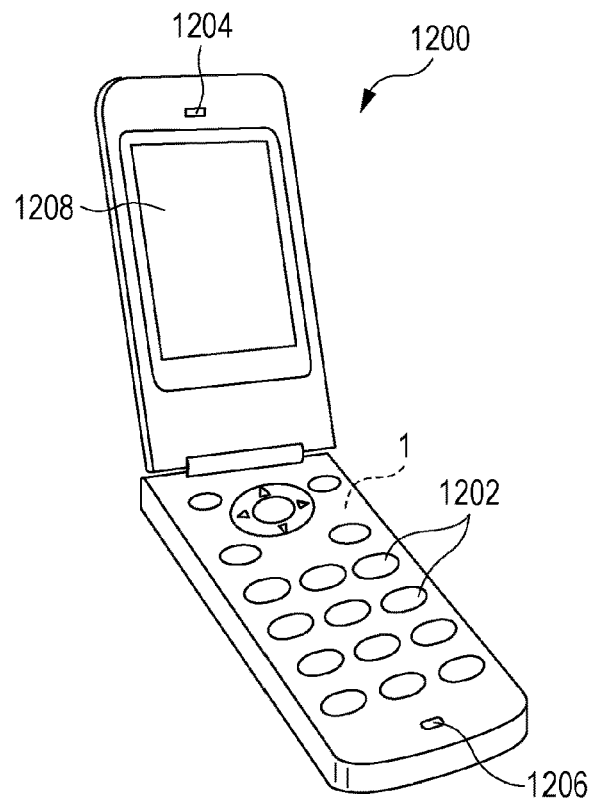
FIG. 9 is a perspective diagram illustrating a configuration of a mobile phone (also including PHS) to which the electronic device of the invention is applied.

FIG. 9 is a perspective diagram illustrating a configuration of a mobile phone (also including PHS) to which the electronic device of the invention is applied.

In this drawing, a mobile phone 1200 includes an antenna (which is not shown in the drawings), a plurality of operation buttons 1202, a receiving port 1204, and a transmission port 1206, and a display section 1208 is arranged between the operation buttons 1202 and the receiving port 1204. The physical quantity sensor 1, which measures the physical quantity of acceleration, angular velocity, and the like in order to measure falling or inclination of such a mobile phone 1200, is mounted in the mobile phone 1200. In this manner, it is possible to obtain the mobile phone 1200 with high reliability by mounting the physical quantity sensor 1 described above.

Figure 10:
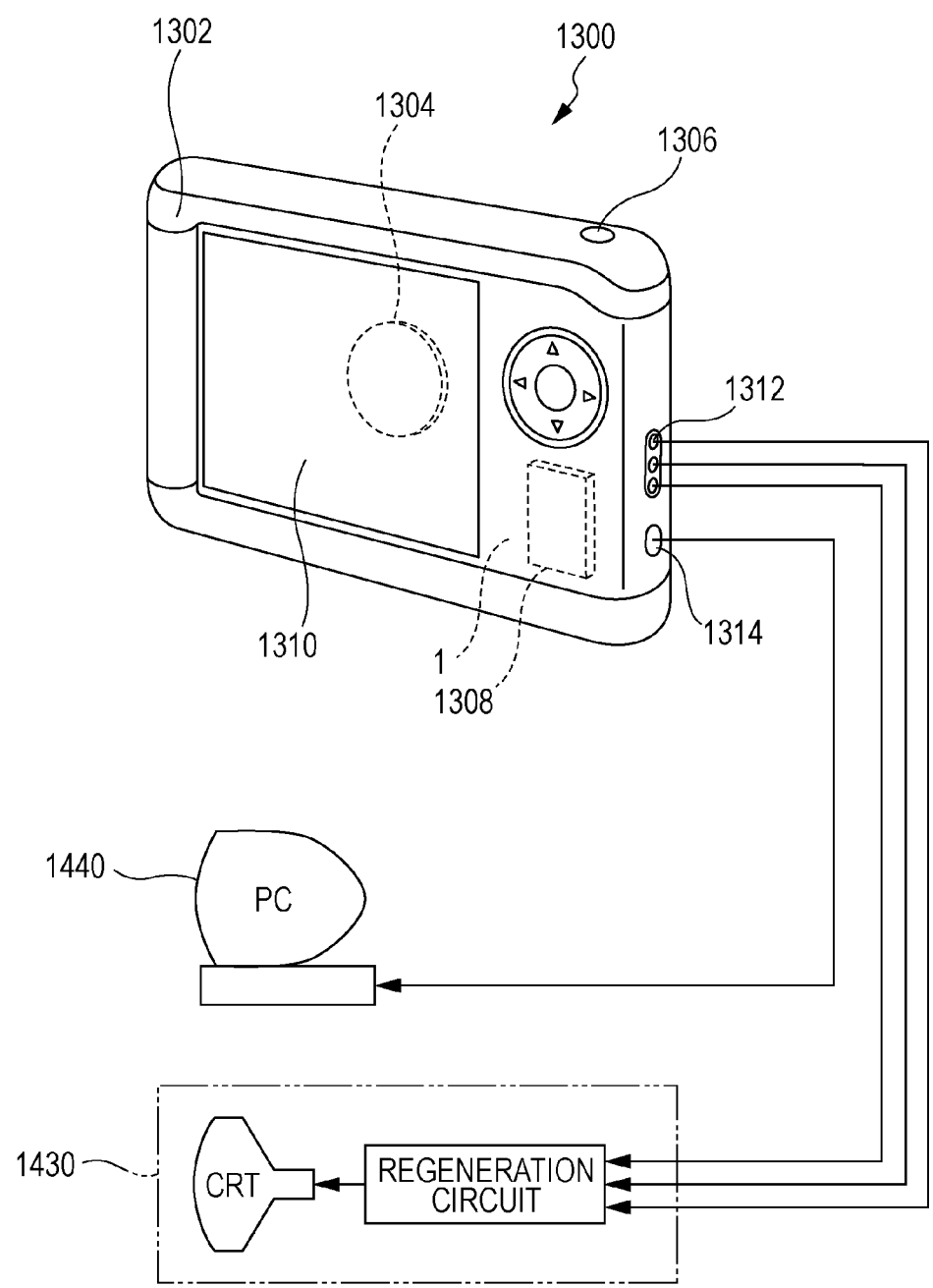
FIG. 10 is a perspective diagram illustrating a configuration of a digital still camera to which the electronic device of the invention is applied.

FIG. 10 is a perspective diagram illustrating a configuration of a digital still camera to which the electronic device of the invention is applied. Here, this drawing also illustrates the connection of an external device in a simplified manner.

Here, a normal camera, with respect to photosensitizing a silver halide photographic film using an optical image of a subject, and a digital still camera 1300 generate an image pickup signal (image signal) by photoelectric conversion of an optical image of a subject using an imaging element such as a charge coupled device (CCD).

The display section 1310 is included on the rear surface of a case (body) 1302 in the digital still camera 1300, and is configured to perform display based on the image pickup signal using the CCD, and the display section 1310 functions as a viewfinder which displays a subject as an electronic image. In addition, a light-receiving unit 1304 which includes an optical lens (imaging optical system), CCD, and the like is included at the front surface side (the rear surface side in the drawing) of the case 1302.

A subject image which is displayed on the display section 1310 is confirmed by a photographer, and at the point in time when a shutter button 1306 is pressed down, the image pickup signal of the CCD is transferred to and stored in a memory 1308. In addition, a video signal output terminal 1312 and an input and output terminal 1314 for data communication are included on a side surface of the case 1302 in the digital still camera 1300. Then, as exemplified, a television monitor 1430 is connected to the video signal output terminal 1312, or a personal computer 1440 is connected to the input and output terminal 1314 for data communication according to need. Furthermore, using a prescribed operation, the image pickup signal which is stored in the memory 1308 is configured so as to be output to the television monitor 1430 or the personal computer 1440. The physical quantity sensor 1, which measures the physical quantity of acceleration, angular velocity, and the like in order to measure falling or inclination of such a digital still camera 1300, is mounted in the digital still camera 1300. In this manner, it is possible to obtain the digital still camera 1300 with high reliability by mounting the physical quantity sensor 1 described above.

Here, in addition to the personal computer in FIG. 8 (mobile-type personal computer), the mobile phone in FIG. 9, and the digital still camera in FIG. 10, it is also possible to apply the electronic device of the invention to, for example, an ink jet-type discharging apparatus (for example, an ink jet printer), a laptop-type personal computer, a television, a video camera, a video tape recorder, a car navigation device, a pager, an electronic organizer (including those having a communication function), an electronic dictionary, an electronic calculator, an electronic game device, a word processor, a work station, a video phone, a television monitor for crime prevention, a pair of electronic binoculars, a POS terminal, medical equipment (for example, an electronic thermometer, a blood pressure meter, a blood glucose meter, an electrocardiographic measuring device, an ultrasonic diagnostic device, or an electronic endoscope), a fish finder, various measurement equipment, an instrument (for example, an instrument for a vehicle, an aircraft, or a ship), a flight simulator, and the like.

4. Mobile Body

Figure 11:
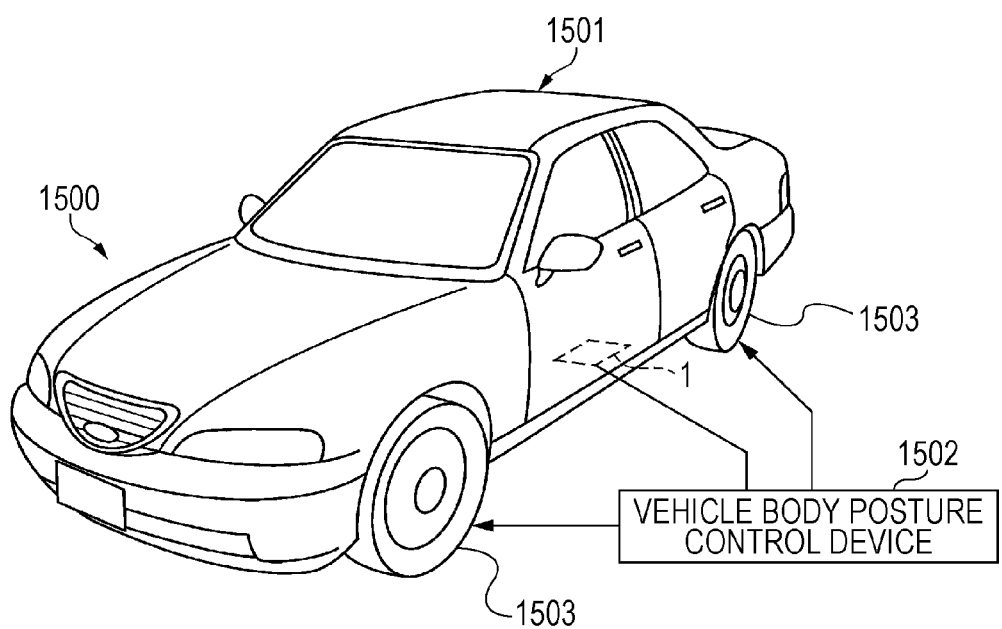
FIG. 11 is a perspective diagram illustrating an automobile to which a mobile body of the invention is applied.

Next, a mobile body of the invention will be described. FIG. 11 is a perspective diagram illustrating an automobile to which the mobile body of the invention is applied.

The physical quantity sensor 1 is built into an automobile 1500, and for example, it is possible to detect the posture of a vehicle 1501 using the physical quantity sensor 1. The detection signal of the physical quantity sensor 1 is supplied to a vehicle body posture control device 1502, the vehicle body posture control device 1502 detects the posture of the vehicle 1501 based on the detection signal, and according to the detection result, it is possible to control the hardness of suspension, or control brakes of individual wheels 1503.

The physical quantity sensor, the physical quantity sensor apparatus, the electronic device, and the mobile body of the invention are described above based on the embodiments of the illustrations, but the invention is not limited thereto, and it is possible for the configuration of each section to be substituted with an arbitrary configuration which has the same function. In addition, other arbitrary constructions may be added to the invention. In addition, the invention may be a combination of two or more arbitrary configurations (characteristics) among each of the embodiments.

The entire disclosure of Japanese Patent Application No. 2014-165430, filed Aug. 15, 2014 is expressly incorporated by reference herein.

What is claimed is:

1. A physical quantity sensor comprising:
   a first structure which has a movable section that includes movable electrode fingers;
   a second structure which includes first fixed electrode fingers that are arranged to oppose the movable electrode fingers;
   a third structure which includes second fixed electrode fingers that are arranged to oppose the movable electrode fingers;
   an electrostatic capacity forming section that forms a first electrostatic capacity between the first structure and the second structure; and
   a first electrostatic capacity adjusting section that is configured to adjust the first electrostatic capacity,
   wherein the first structure has a first support section which supports the movable section,
   the first support section has a first extending section which extends from the first support section, the first extending section has a first leading end side surface, and the first leading end side surface is located directly adjacent to a first finder side surface of one of the first fixed electrode fingers, and
   the first electrostatic capacity adjusting section is configured by the first leading end side surface and the finger side surface of the one of the first fixed electrode fingers.

2. The physical quantity sensor according to claim 1,
   wherein the electrostatic capacity forming section forms a second electrostatic capacity between the first structure and the third structure, and a second electrostatic capacity adjusting section is configured to adjust the second electrostatic capacity,
   wherein the first structure has a second support section that is different from the first support section, and the second support section supports the movable section,
   the second support section has a second extending section which extends from the second support section, the second extending section has a second leading end side surface, and the second leading end side surface is located directly adjacent to a second finger side surface of one of the second fixed electrode fingers, the second electrostatic capacity adjusting section is configured by the second leading end side surface and the second finger side surface of the one of the second fixed electrode fingers, and wherein a first area of the first leading end side surface is larger than a second area of the second leading end side surface, and a first electrostatic capacity value of the first electrostatic capacity forming section is larger than a second electrostatic capacity value of the second electrostatic capacity forming section.

3. A physical quantity sensor apparatus comprising:
the physical quantity sensor according to claim 2; and
an electronic component which is electrically connected to the physical quantity sensor.

4. An electronic device comprising:
a housing that houses the physical quantity sensor according to claim 2; and
a display that is assembled in the housing.

5. A mobile body comprising:
a housing that houses the physical quantity sensor according to claim 2; and
a display that is assembled in the housing.

6. A physical quantity sensor apparatus comprising:
the physical quantity sensor according to claim 1; and
an electronic component which is electrically connected to the physical quantity sensor.

7. An electronic device comprising:
a housing that houses the physical quantity sensor according to claim 1; and
a display that is assembled in the housing.

8. A mobile body comprising:
a housing that houses the physical quantity sensor according to claim 1; and
a display that is assembled in the housing.

9. A physical quantity sensor comprising:
a first structure which has a movable section that includes movable electrode fingers;
a second structure which includes first fixed electrode fingers that are arranged to oppose the movable electrode fingers;
a third structure which includes second fixed electrode fingers that are arranged to oppose the movable electrode fingers;
an electrostatic capacity forming section that forms a first electrostatic capacity between the first structure and the second structure; and
an electrostatic capacity adjusting section that is configured to adjust the first electrostatic capacity,
wherein the first structure has a support section which supports the movable section, the support section has an extending section which extends from the support section in a first direction,
wherein the second structure has a connecting section which connects the first fixed electrode fingers, a first part of the connecting section extends in the first direction, the first part of the connecting section is located directly adjacent to the extending section of the support section of the first structure so that a side surface of the first part of the connecting section directly faces a side surface of the extending section, and the first part is located opposite to the movable electrode fingers with respect to the support section, and the electrostatic capacity adjusting section is configured by the side surface of the extending section and the side surface of the first part of the connecting section.

10. A physical quantity sensor apparatus comprising:
the physical quantity sensor according to claim 9; and
an electronic component which is electrically connected to the physical quantity sensor.

11. An electronic device comprising:
a housing that houses the physical quantity sensor according to claim 9; and
a display that is assembled in the housing.

12. A mobile body comprising:
a housing that houses the physical quantity sensor according to claim 9; and
a display that is assembled in the housing.

13. A physical quantity sensor comprising:
a first structure which has a movable section that includes movable electrode fingers;
a second structure which includes first fixed electrode fingers that are arranged to oppose the movable electrode fingers;
a third structure which includes second fixed electrode fingers that are arranged to oppose the movable electrode fingers; and
an electrostatic capacity forming section that forms a first electrostatic capacity between the first structure and the second structure,
wherein the first structure has a support section which supports the movable section, a wiring outwardly extend from the support section in a first direction, and the wiring is electrically connected to the movable section via the support section,
wherein the second structure has a connecting section which connects the first fixed electrode fingers, a first part of the connecting section extends in a second direction perpendicular to the first direction, the first part is located directly adjacent to the support section of the first structure, the first part is located opposite to the movable electrode fingers with respect to the support section, and
the electrostatic capacity forming section is configured by an overlapped section between the wiring and the first part of the connecting section.

14. A physical quantity sensor apparatus comprising:
the physical quantity sensor according to claim 13; and
an electronic component which is electrically connected to the physical quantity sensor.

15. An electronic device comprising:
a housing that houses the physical quantity sensor according to claim 13; and
a display that is assembled in the housing.

16. A mobile body comprising:
a housing that houses the physical quantity sensor according to claim 13; and
a display that is assembled in the housing.

* * * * *